July 29, 1941.  D. E. AUSTIN  2,250,619
COMBINED PACKAGE RACK AND AIR DUCT
Filed May 1, 1939  3 Sheets-Sheet 2
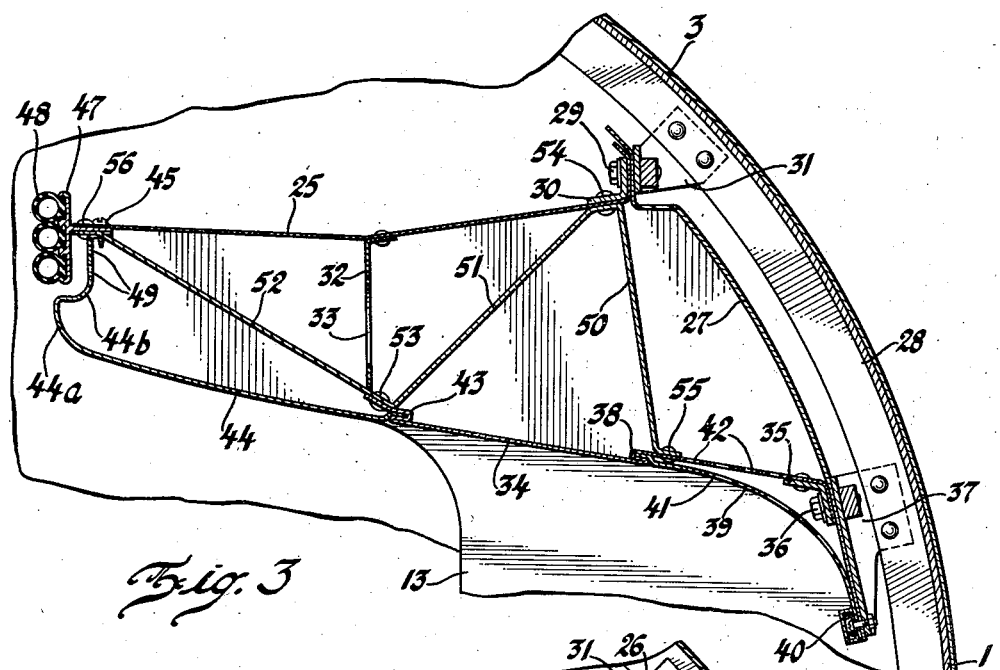
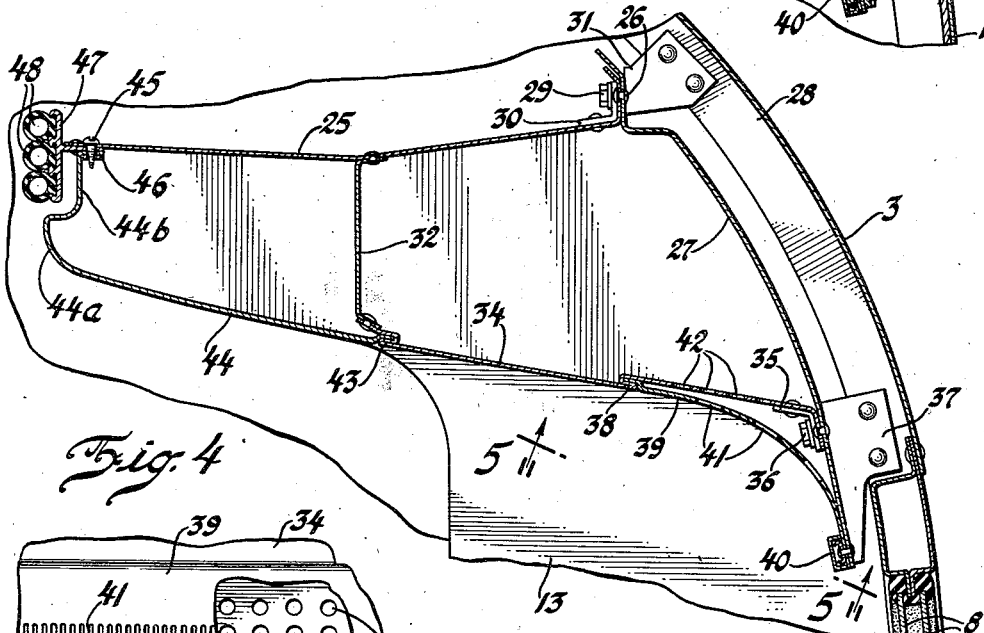
Inventor
Dwight E. Austin
By Blackmore, Spencer & Hurd
Attorneys July 29, 1941.  D. E. AUSTIN  2,250,619
COMBINED PACKAGE RACK AND AIR DUCT
Filed May 1, 1939  3 Sheets-Sheet 3

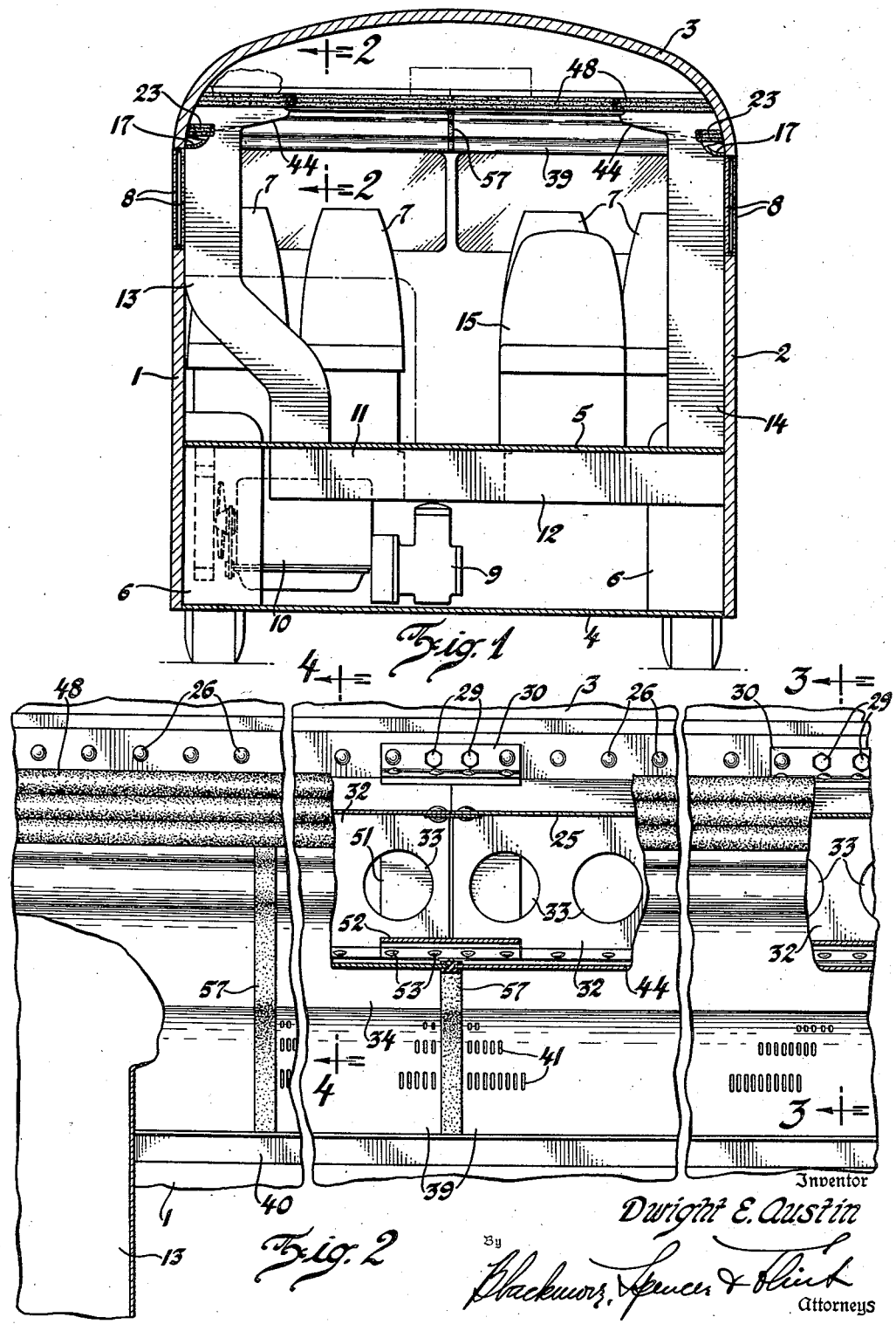

Inventor
Dwight E. Austin
By Blackmore, Lenna & Olink
Attorneys

Patented July 29, 1941

2,250,619

UNITED STATES PATENT OFFICE 2,250,619

COMBINED PACKAGE RACK AND AIR DUCT

Dwight E. Austin, Pontiac, Mich., assignor to Yellow Truck & Coach Manufacturing Company, Pontiac, Mich., a corporation of Maine Application May 1, 1939, Serial No. 271,116

4 Claims. (Cl. 98—2)

This invention relates to air conditioned passenger conveyances and among other things it is directed toward increased passenger comfort and convenience and the presentation of a neat and pleasing interior appearance.

One of the objects of the invention is to combine in a single assembly a package rack and an air duct for the distribution of conditioned air throughout the passenger compartment. The rack and duct assembly is so designed as to be of light weight with built-in strength for loads to be carried and furthermore it is constructed as an integral part of the body side wall serving in a measure to stiffen the body but more particularly blending smoothly into the general overall appearance without interference to passenger space accommodation.

A further object is to provide for the distribution of conditioned air throughout the coach and the direction thereof both over the coach windows to avoid moisture collection and impaired vision and toward the region of passenger occupancy. In connection with the distribution and direction of air the combined rack and duct assembly along each side wall has two sets of discharge openings, one located along the outermost edge of the assembly and above the side wall passenger seats and the other set along the innermost edge of the duct above the seats adjoining the aisle. The last mentioned outlets are concealed behind and open into a channel formed by a protection guard extending along the inner edge of the assembly and also projecting above and affording a parcel retaining flange for the package shelf.

Figure 6:
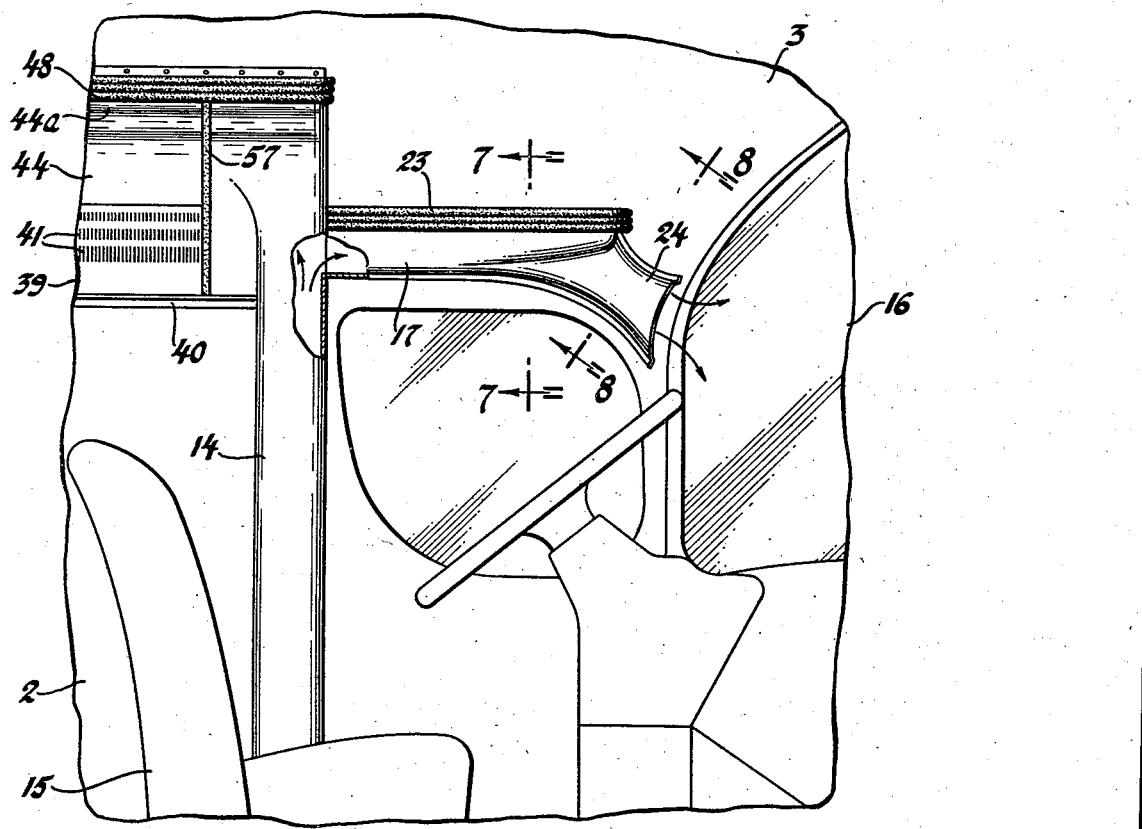
Figure 7:
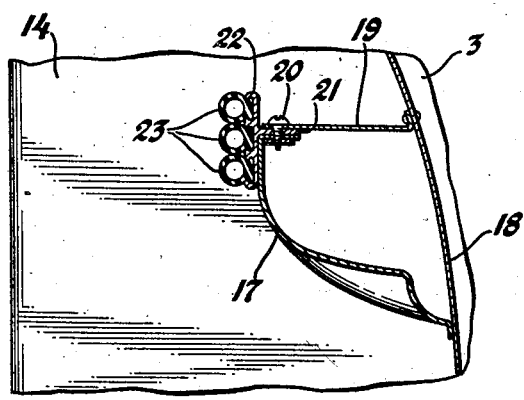
Figure 8:
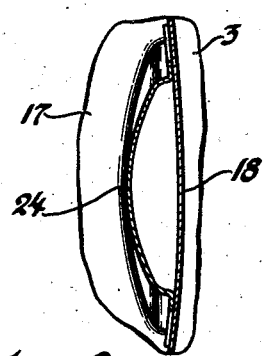

Additional objects and advantages of the construction will be apparent from the following specification having reference to a preferred embodiment of the invention as disclosed in the accompanying drawings wherein Figure 1 is a transverse sectional view of a motor coach at the front end of the coach body; Figure 2 is an enlarged fragmentary elevational view of the package rack assembly as viewed in the direction of the arrows on line 2—2 of Figure 1 with parts broken away; Figures 3 and 4 are transverse sectional views taken on lines 3—3 and 4—4, respectively, of Figure 2; Figure 5 is a detail view of a portion of the underside of the assembly as viewed in the direction of the arrows on line 5—5 of Figure 4; Figure 6 shows a portion of the coach interior adjacent the operator's station at the front of the vehicle and Figures 7 and 8 are detail sectional views taken on lines 7—7 and 8—8, respectively, of Figure 6.

The coach body illustrated includes a pair of side walls 1 and 2, a roof 3 and a bottom wall 4, together with a raised passenger seating deck or floor 5. The wheel housing 6—6 in the side walls project upwardly a slight distance above the level of the seating deck 5 but are so small as not to interfere with seating arrangements or cause crowding of passengers occupying the seats 7 arranged on both sides of a central aisle. In passing it may be noted that the observation windows as seen in Figure 1 comprise a pair of glass panes 8 having a dead air space between them for heat insulation purposes.

In the space between the bottom wall 4 and the raised deck 5 there may be positioned the vehicle driving mechanism or power plant which preferably is located adjacent the rear wall and behind the driving axle. Forward of the driving axle the underfloor space may be utilized for luggage lockers for stowing trunks, handbags and other bulky baggage. In addition a part of the air conditioning mechanism may be housed under the floor, including suitable air circulating blowers or fans, filters, air heaters and air coolers, all of which form no part of the present invention and, therefore, need not be illustrated. The drawings do show, however, the location of a refrigerant compressor 9 and its driving engine 10, which parts preferably are removably mounted in the underfloor space to reduce dead load when the vehicle is operated in the wintertime or throughout the season when cooling and dehumidifying is not required for passenger comfort. It will be understood that the cooling coil, filter and heater are located within an underfloor air duct which extends throughout the length of the vehicle along the center line and has suitable exhaust openings through the floor for evacuating air inside the coach and passing it over the conditioning devices.

At its front end the duct delivers conditioned air into a pair of laterally extending branches 11 and 12 which lead toward the side walls for connection with the vertical risers 13 and 14, respectively. The riser 13 is located immediately behind the entrance opening in the front of the vehicle and has an offset at its lower end to clear the adjacent wheel well 6. On the other hand the riser 14 extends upwardly from just ahead of the adjacent wheel well 6 and occupies the space beside the operator's seat 15 against the side wall 2. Both risers 13 and 14 at their upper ends open rearwardly into hollow box-like assemblies which constitute racks for small parcels, articles of clothing and the like and which extend rearwardly to and across the rear wall of the vehicle above the windows 8 and over the heads of passengers occupying the side wall seats. Similarly both risers communicate with forwardly extending ducts, each of which terminates in an open mouth at the upper and outer corner of the window 16 in the coach front wall, as seen in Figure 6, so as to direct air over the interior surface of the windshield and thereby prevent fogging on the inside and the collection of ice on the outside of the windshield glass.

The forwardly extending ducts are similar to each other and may comprise a curved bottom wall 17 secured at its lower end to an interior wall panel 18 and at its upper end to a top wall or ledge 19, which also is secured at its outer edge to the panel 18. A series of fastening screws 20 secure together the adjacent edges of the walls 17 and 19 and serve to mount the lateral attaching flange 21 of a vertical guard rail 22 which carries on its inner face a series of hollow rubber cylinders or tubular buffers 23 acting as cushions to reduce the likelihood of injury in the event a person bumps against the assembly. It will be noted that the guard rail or mounting plate 22 extends upwardly above the ledge 19 and, therefore, provides a retaining wall for any articles which may be laid on the ledge 19. This shelf at the driver's station can be used primarily for the convenience of the operator. Extending downwardly and forwardly from the front end of the curved plate 17 is an inwardly bowed member 24 having attaching flanges along opposite sides for connection with the interior wall panel 18 to provide a passageway which as before indicated discharges air over the interior surface of the windshield 16.

The package rack assembly extending along both side walls and across the rear wall of the vehicle with its hollow interior communicating at the front with both of the risers 13 and 14 is constructed, as best seen in the sectional view Figure 4, of light weight sheet metal panels which are secured together to form a hollow duct and are internally braced for strengthening purposes. It is carried by the several body posts below the roof and its upper or top wall 25 provides a shelf for the convenience of the passengers in disposing primarily of small packages, articles of clothing and the like.

At its outer edge the upper wall 25 terminates in an upwardly extending flange to be secured by rivets 26 or the like to the upper portion of a curved outer wall plate 27. At intervals in alignment with each of the several body posts 28 a fastening stud 29 passes through the joined portions of the walls 25 and 27 and through an angle bracket 30 carried thereby for mounting the rack to a supporting bracket 31 on the body post 28. Along a central line the top wall 25 has riveted thereto a series of dependent supporting plates 32 which, as seen in Figure 2, have a series of large openings 33 therein for the free movement of air from one side to the other of the dependent plates 32.

The bottom edge of the support 32 is riveted or otherwise secured to the inner edge of a lower wall section 34 which extends outwardly and has its outer edge riveted to a lower intermediate portion of the side plate 27. It also carries a series of spaced angle brackets 35 to be attached by bolts 36 to a supporting bracket 37 on the post 28. Intermediate its inner and outer edges the lower wall section 34 is reversely bent upon itself as at 38 to provide an open longitudinal channel for the reception of the innermost edge of a curved corner plate 39 which extends downwardly and is riveted or otherwise secured at its lower end to the lower edge of the side wall 27. For appearance purposes a decorative molding strip 40 may be carried by the joined lower edges of the assembly. As best seen in Figure 5 the curved corner plate 39 is provided with spaced rows of narrow slits 41 for the distribution of air from the hollow duct downwardly toward the region occupied by passengers in the seats adjacent the body side wall. To regulate the passage of air downwardly and through the distribution slots 41, the bottom wall 34 behind the curved corner plate 39 and between the reverse bend 38 and the attachment brackets 35, may be provided with metering openings or perforations 42 of preselected size and spacing.

At its innermost edge adjacent its connection with the supporting plate 32, the bottom wall section 34 is provided with a second reversely bent portion 43 to provide a longitudinally extending channel for the reception of the outer edge of a bottom and inner side wall panel 44. The major portion of the wall 44 extends upwardly and inwardly in alignment with and as a continuation of the wall section 34 and its side wall portion comprises an upwardly curved bead 44a and an outwardly offset portion 44b for connection at its upper end by the fastening screws 45 to the inner edge of the top wall 25. To insure a firm anchorage of the screws 45 a metal tapping strip 46 is fitted against the underside of the attaching flange of the wall 44b. Here again the fastening screws 45 hold in place the lateral anchoring flange of the buffer rail 47 which carries the hollow rubber cylinders or tubes 48 on its outer face and projects upwardly above the plane of the shelf 25 for retaining parcels thereon. It also projects downwardly in spaced relation to the offset side wall 44b and forms a downwardly directed channel for delivering conditioned air toward the region of the passengers occupying the aisle seats 7. Communication with the interior of the duct is afforded by a series of air regulating openings 49 contained within the upper portion of the wall 44b and concealed behind the buffer rail 47.

To impart stiffness to the light weight panel assembly and insure proper support of the load, diagonal braces in the form of substantially Z-shaped struts are contained within the hollow structure at spaced intervals, preferably in alignment with the several body posts. The incorporation of the braces is best shown in Figure 3 as including an upwardly and inwardly extending leg 50, a downwardly and inwardly extending brace 51 and an upwardly and inwardly extending brace 52. The braces 51 and 52 are secured at their apex by a series of rivets 53 to the inner edge of the lower wall section 34 while the braces 50 and 51 are secured at their apex by rivets 54 to the mounting bracket 30. The fastening rivets 55 secure the lower end of the brace 50 to an intermediate portion of the wall 34 and rivets 56 secure the inner end of the brace 52 to the inner end portion of the upper wall 25. By reason of the diagonal bracing, racking strains are resisted and the load is effectually transmitted into the body side walls, the body side walls being in turn stiffened by the inwardly extending package rack assembly.

The several wall panels of the assembly may extend continuously in one piece throughout the length of the duct, although for convenience of manufacture it will be preferable to use a series of relatively long panel sections arranged end to end with the abutting ends joined together and sealed by welding or soldering. Optionally, instead of rigidly joining the adjoining ends of the panels their adjacent edges may be simply brought close together and sealed by a rubber joint strip, which as shown at 57 is of H-shape in section to fit the edges of the panels. The use of the rubber joining strip 57 will facilitate replacement of panel sections in the event of damage.

In the operation of the air conditioning system the air circulating blowers will draw air from the inside of the coach into the longitudinally extending underfloor duct for action thereon by the conditioning mechanism and subsequent delivery through the risers into the longitudinally extending ducts from which the conditioned air is distributed throughout the interior of the vehicle toward the region of passenger occupancy and over the window surfaces.

I claim:

1. In a passenger coach, a hollow structure projecting inwardly above the passenger seats with its upper wall providing a package shelf, a protection guard supported at the inner side of the structure with a portion projecting above the upper wall as a package retaining flange and a portion projecting downwardly in spaced relation with the inner wall of the hollow structure to afford an air distribution channel and air flow regulating openings in said inner wall and behind said protection guard for admitting air from the hollow structure into the distribution channel.

2. A combined package rack and air duct assembly, including a package supporting upper wall, an outer side wall secured at its upper edge to the outer edge of the upper wall, a lower wall section having a pair of transversely spaced portions reversely bent upon itself to provide longitudinally extending channels and a perforate portion projecting outwardly from the outermost bend and being secured to an intermediate portion of said side wall, a curved corner plate overlying said perforate portion and having air distributing openings therein with one longitudinal edge fitted into the channel of outermost bend and its opposite longitudinal edge secured to the bottom of said side wall, a spacer strut connecting the inner edge of the lower wall section with an intermediate portion of the upper wall and an inner corner wall having its outer longitudinal edge fitted into the channel of the innermost bend of the lower wall section and having its inner longitudinal edge secured to the inner edge of said package supporting upper wall.

3. In a passenger coach having a forward operator station behind the windshield, a relatively wide parcel rack extending rearwardly from the operator station in overhead relation to the passenger seats, a relatively narrow forwardly extending parcel rack, offset laterally in relation to the operator station, means supporting the overhead racks in spaced relation with the coach ceiling to provide parcel receiving room, both of said racks being hollow and thereby constituting combined parcel racks and air ducts with the forwardly extending duct bridging the operator station and terminating adjacent the windshield in a discharge mouth for directing air flow across the windshield surface and the rearwardly extending duct having spaced air distribution openings therein and an air delivery riser leading upwardly beside the operator station to both ducts.

4. A combined air duct and package shelf arranged as a structural stiffening member for coach side wall body posts and comprising a relatively wide package supporting wall mounted at its outer longitudinal edge on the body posts and a relatively narrow wall spaced below the first mentioned wall and also mounted at its outer longitudinal edge on the body posts, an outer side wall closure between the outer edges of the walls, tie suspension means connecting the inner longitudinal edge of the lower narrow wall with an intermediate portion of the upper wide wall, diagonal trusses connected to the inner edge of the lower narrow wall and extending divergently toward and connected to the inner and outer longitudinal edges of the upper wide wall and an inner side wall closure connected at opposite edges with the inner longitudinal edges of the wide and the narrow walls.

DWIGHT E. AUSTIN.